United States Patent

Tyndall, III

[11] Patent Number: 5,909,337
[45] Date of Patent: Jun. 1, 1999

[54] MAGNETIC RECORDING DEVICE

[75] Inventor: George William Tyndall, III, San Jose, Calif.

[73] Assignee: International Business Machines Corporation, Armonk, N.Y.

[21] Appl. No.: 08/909,987

[22] Filed: Aug. 12, 1997

[51] Int. Cl.$^6$ .................................................. G11B 33/14
[52] U.S. Cl. ........................................................ 360/97.01
[58] Field of Search ........................... 360/97.01, 97.02; 369/72; 428/422, 694 TP, 694 TF, 900

[56] References Cited

U.S. PATENT DOCUMENTS

| | | | |
|---|---|---|---|
| 3,696,050 | 10/1972 | Werts, III et al. | 252/403 |
| 4,267,238 | 5/1981 | Chernega | 428/422 |
| 4,268,556 | 5/1981 | Pedrotty | 428/65 |
| 4,613,548 | 9/1986 | Lum | 428/411.1 |
| 4,684,510 | 8/1987 | Harkins | 423/210 |
| 4,722,017 | 1/1988 | Vannet et al. | 360/133 |
| 4,789,913 | 12/1988 | Gregory et al. | 360/97.03 |
| 5,030,260 | 7/1991 | Beck et al. | 55/316 |
| 5,075,807 | 12/1991 | Inoue et al. | 360/97.02 |
| 5,114,793 | 5/1992 | Okada et al. | 428/425.9 |
| 5,124,856 | 6/1992 | Brown et al. | 360/97.03 |
| 5,229,899 | 7/1993 | Brown et al. | 360/97.02 |
| 5,230,964 | 7/1993 | Kar et al. | 428/694 |
| 5,367,417 | 11/1994 | Brown et al. | 360/97.02 |
| 5,373,407 | 12/1994 | Stupak, Jr. et al. | 360/99.08 |
| 5,406,431 | 4/1995 | Beecroft | 360/97.02 |
| 5,441,655 | 8/1995 | Odello et al. | 252/49.9 |
| 5,485,327 | 1/1996 | Yanagisawa | 360/97.02 |
| 5,500,038 | 3/1996 | Dauber et al. | 96/135 |
| 5,515,214 | 5/1996 | Kiyonaga et al. | 360/97.02 |
| 5,534,169 | 7/1996 | Vinci | 508/460 |
| 5,707,742 | 1/1998 | Usuki et al. | 428/422 |

FOREIGN PATENT DOCUMENTS

| | | |
|---|---|---|
| 0287892A2 | 4/1988 | European Pat. Off. . |
| 05234353 | 9/1993 | Japan . |

*Primary Examiner*—George J. Letscher
*Attorney, Agent, or Firm*—Merchant, Gould, Smith, Edell, Welter & Schmidt, P.A.

[57] ABSTRACT

A magnetic recording device having (a) a housing, (b) a disk positioned in the housing or a motor, (c) a motor associated with the disk operable for rotating the disk at a selected rotational speed; (d) a head supported on a slider for a magnetically reading data from or magnetically writing data to the magnetic layer on the disk; (e) an actuator positioned in the housing and connected to the slider for moving the head across the disk; and (f) a liquid or solid, volatile base positioned in the housing to prevent the formation of polymeric deposits.

14 Claims, 1 Drawing Sheet

MAGNETIC RECORDING DEVICE

TECHNICAL FIELD

The present invention relates to a magnetic recording device having improved resistance to formation of polymeric deposits.

BACKGROUND OF THE INVENTION

Current growth rates for the digital magnetic recording data storage industry show an increase in recording densities of 60 percent per year. To continue on this growth rate curve, the recording industry is being forced to make a number of significant changes in the design of the magnetic recording device. Digital magnetic recording devices for data storage generally comprise a thin film magnetic recording disk and a head or transducer which is moved along or above the surface of the rotating disk to read and write information on the disk. Advanced high areal density, thin film magnetic recording disks generally comprise preferably a textured rigid substrate, a magnetic layer such as a cobalt-based metal alloy, a protective amorphous carbon layer, and a lubricant layer such as a perfluoropolyether disposed on the carbon overcoat. The disk texture can be a full disk or, alternatively, a dual-zone texture.

The recording device comprises a positioning actuator connected to the head for moving the head to the desired location on the disk during reading or writing operations. The head is attached to a carrier or slider having an air-bearing surface which is supported during operation adjacent to the data surface of the disk by a cushion of air generated by the rotating disk. Since recording density depends exponentially on the separation distance between the recording head and the magnetic layer of the disk, lower fly heights are needed for high areal density recording. However, lower fly heights can cause an increase in the interaction of the head with the disk during normal flying. These interactions of the head and the disk result in the formation of amorphous deposits on the head and disk surfaces. These amorphous deposits result from polymerization occuring at the head-disk interface of gaseous contaminants present in the drive such as gaseous hydrocarbons, acrylates, siloxanes, and phthalates. These gaseous contaminants form from the thermal degradation of polymeric greases, adhesives, seals and lubricants present in the drive enclosure. With continued growth, these polymeric deposits can lead to a number of interface failures. For example, the formation of polymeric deposits on the magnetic recording disk can lead to an increase in the number of thermal asperities. Formation of polymeric deposits on the air bearing surface of the slider can lead to a fly height drop, accelerating the formation of these deposits. With continued growth, these deposits can cause a head crash with resulting failure of the disk drive. There is a need in the art for a disk drive which is designed to minimize the formation of thermal asperities.

It is an object of the present invention to provide an improved noncontact magnetic recording device which operates with improved resistance to polymerization of gaseous contaminants at the head-disk interface.

Other objects and advantages will be apparent from the following disclosure.

SUMMARY OF THE INVENTION

The present invention relates to a high areal density, digital magnetic recording data storage device for recording having improved resistance to the formation of polymeric deposits. The high areal density magnetic recording device of the present invention comprises (a) a housing, (b) a disk positioned in the housing contiguous to a motor and comprising a substrate (optionally textured), a metallic magnetic layer, an optional amorphous carbon layer, and a lubricant layer; (c) a motor associated with the disk operable for rotating the disk at a selected rotational speed; (d) a head supported on an air-bearing carrier (head and carrier are an integral member) for magnetically reading data from or magnetically writing data to the magnetic layer on the disk; (e) an actuator positioned in the housing and connected to the head carrier for moving the head across the disk; and (f) a liquid or solid, volatile polymerization inhibitor positioned in the housing preferably in a container. The polymerization inhibitor is preferably an organic Lewis base e.g., an amine. It has been discovered that the amine vapors in the disk file substantially inhibit the formation and buildup of polymeric deposits on the disk and head surfaces.

A more thorough disclosure of the present invention is presented in the detailed description which follows and the accompanying figures.

DETAILED DESCRIPTION OF THE INVENTION

The present invention relates to an improved high performance digital magnetic recording device for reading and writing data magnetically.

Figure 1:
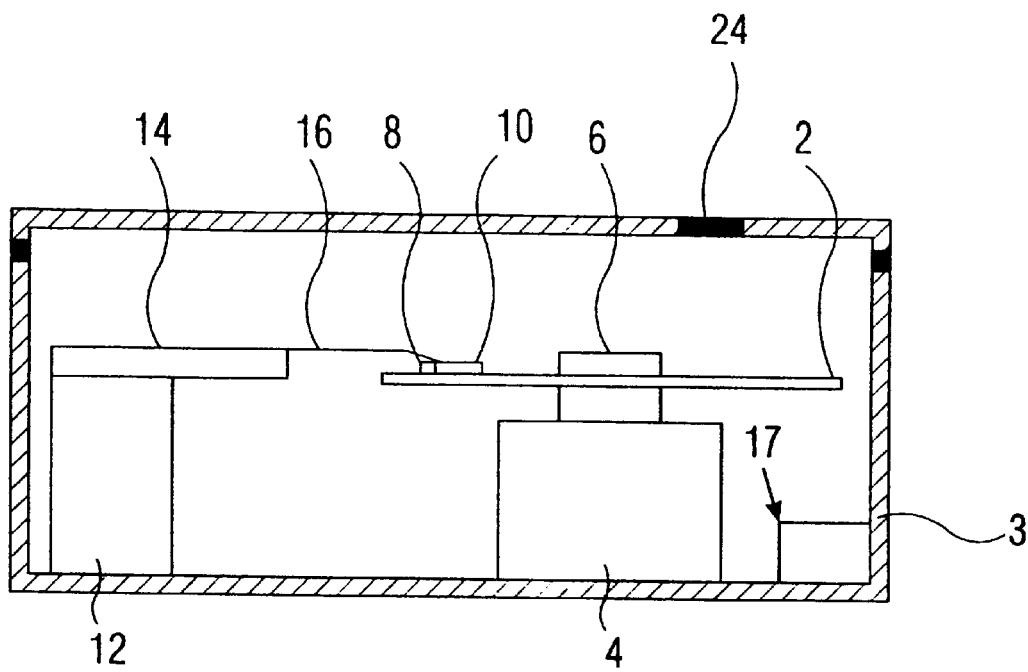
FIG. 1 is a sectional view of the magnetic recording disk drive of the present invention.
Figure 2:
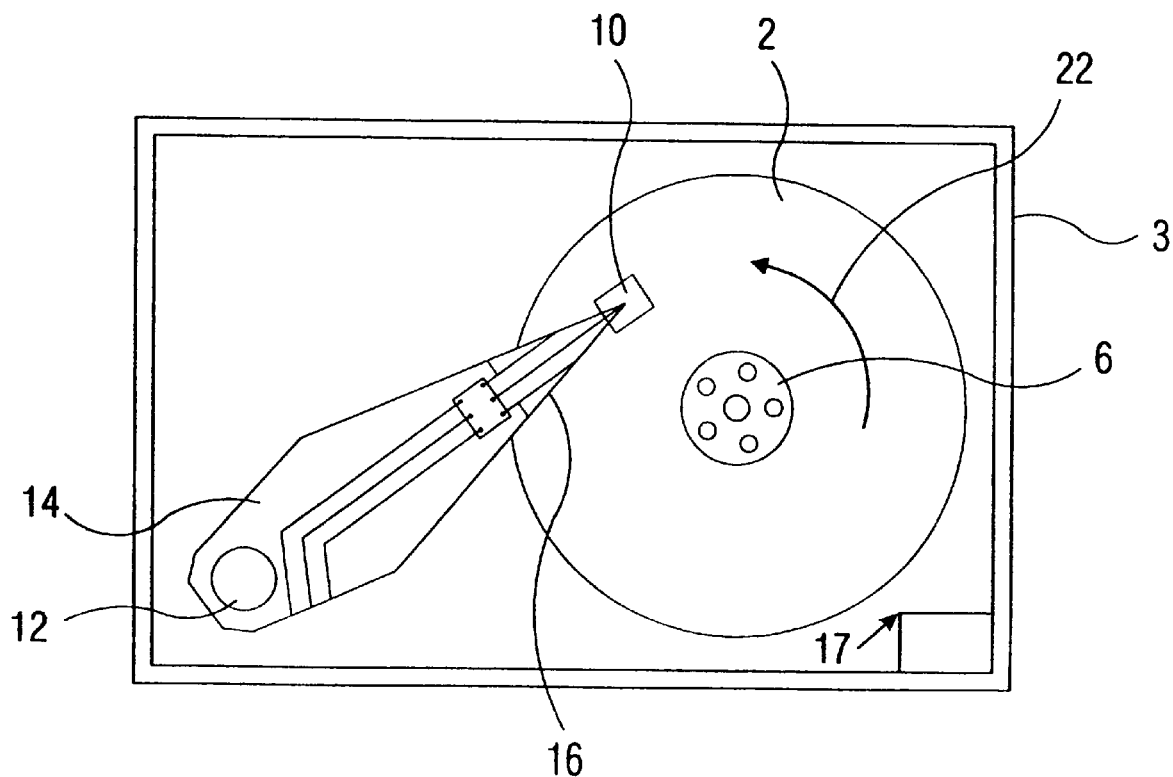
FIG. 2 is a top view of the magnetic recording disk drive of the present invention.

Referring to FIGS. 1 and 2, there is shown a noncontact magnetic recording disk drive of the present invention. The magnetic recording disk 2 is positioned in housing 3 and is rotated by drive motor 4 with hub 6, which is attached to the drive motor. The disk comprises a substrate, a metallic magnetic layer, an optional carbon layer, and a polymeric lubricant layer, e.g., perfluoropolyether. The substrate may be textured or smooth. The thickness of the lubricant layer on the disk may vary from about 5–15 Å.

A read/write head or transducer 8 is formed on the trailing end of a carrier, or slider 10. Suitable sliders are positive or negative air-bearing sliders. Suitable negative air-bearing sliders are disclosed in U.S. Pat. Nos. 4,894,740 and 5,438,467, the disclosures of which are incorporated herein by reference. Head 8 may be an inductive read and write transducer, or an inductive write transducer with a magnetoresistive read transducer. The slider 10 is connected to the actuator 12 by means of a rigid arm 14 and a suspension 16. The suspension 16 provides a bias force which urges the slider 10 onto the surface of the recording disk 2. Container 17 contains a liquid or solid, volatile polymerization inhibitor e.g., base which is exposed to the atmosphere in the disk housing. In an alternative embodiment, the base is coated on the inner surface of the housing or outer surface of the motor. The base is separated i.e., not mixed with other compositions in the drive such as the disk lubricant to facilitate vaporization of the base into the enclosed housing of the drive. Although the disk housing is substantially sealed against ambient atmosphere, the disk drive is preferably provided with a breather filter 24 to equalize the pressure within the disk enclosure to the ambient environment.

During operation of the disk drive, the drive motor 4 rotates the disk 2 at a constant speed in the direction of arrow 22, and the actuator 12, which is typically a linear or rotary motion coil motor, moves the slider 10 generally radially across the surface of the disk 2 so that the read/write head may access different data tracks on disk 2.

The container (reservoir) 17 is open to the atmosphere in the housing and contains a chemical base which is a liquid or preferably solid at the operating temperature of the drive e.g., 60° C. and at ambient pressure and preferably has a high vapor pressure at 60° C. and ambient pressure. The base is preferably a Lewis base such as an organic amine, diamine, aminophenol, piperidine, aniline pyridine, ammonia, ammonium hydroxide or urea. The base is preferably a liquid or solid, low molecular weight, monomeric amine having a vapor pressure at 60° C. and ambient pressure sufficient to provide amine vapor in the disk enclosure. Preferably, the base will have a vapor pressure at ambient temperature (25° C.) and pressure (760 mm/Hg) of at least about 1 mtorr, preferably at least about 1 torr. In an alternative embodiment, the base can be heated during operation of the drive to increase the vapor pressure of base during operation of this disk drive.

Suitably, the molecular weight $M_n$ of the amine is less than 250, preferably less than 200. The amine may be a primary, secondary, or tertiary amine. Suitable amines have the structure $R_1R_2R_3N$, wherein $R_1$, $R_2$, and $R_3$ are each independently hydrido or $C_{1-8}$ alkyl, phenyl or hydroxyphenyl. Suitable bases are mono di or tri ($C_{1-5}$) alkyl amine e.g., ethylamine, diethylamine, triethylamine and mono and dipropylamine.

The amine in the reservoir 17 vaporizes during operation of the disk drive and collects on the surface of the head and the lubricant layer on the disk. Suitably, the amine has a low surface energy of less than 30 ergs/cm$^2$, preferably less than 25 ergs/cm$^2$, and more preferably less than 20 ergs/cm$^2$. Preferably, the amine has a surface energy about equal to or less than the surface energy of the lubricant on the disk to enhance adherence (e.g., adsorption/absorption) of the amine onto the surface of the lubricant.

In an alternative embodiment of the present invention, a membrane (or polymeric film) could be used to control the release of the base to the drive environment. The polymeric membrane reduces the flow of amine to the drive by diffusion of the amine through the membrane. Diffusion rate is controlled by both the composition and thickness of the membrane.

In another alternative embodiment, the base can be releasably adhered onto the surface of a carbon breather filter. Suitable breather filters are disclosed in Brown et al., U.S. Pat. No. 5,367,417 the disclosure of which is incorporated herein by reference. As chemical contaminants are adsorbed by the filter having releasably adhered base, the filter releases the base into the disk enclosure. Upon operation of the disk drive, contaminants outgassed into the drive will strike the filter.

The amine vapor in the housing condenses on and adheres to the surface of the lubricant layer on the disk to substantially reduce the formation of polymeric deposits during operation of the disk drive.

The following example is a detailed description of the present invention. The detailed description falls within the scope of, and serves to exemplify, the more generally described invention set forth above. The example is presented for illustrative purposes only, and is not intended as a restriction on the scope of the invention.

EXAMPLE 1

A test chamber was constructed to study the polymerization of contaminants within the disk drive environment. This test chamber consisted of a disk drive positioned within a vacuum chamber. The environment under which the disk drive was operated could conveniently be altered by: a) evacuating the air from the chamber via a mechanical vacuum pump, b) introduction of a known pressure of a pure contaminant to the environmental chamber, and c) adjustment of the total pressure via backfilling chamber with air. For the tests described below, the contaminant presure was varied between 0.1–50% of the saturation vapor pressure, and the total pressure in the chamber was maintained at 0.2–0.5 atmosphere to increase the occurrence of head-disk contact during the test. Once the desired partial pressure of the contaminant and the total pressure of the chamber was established, the disk drive was turned on. The drive was operated at 3600 rpm. The test was run without accessing the head, or stopping. Typical test periods ranged from 10–30 min. All testing was done at nominally 30° C. After the test, the disks and the heads were removed for analysis via optical microscopy, AFM, and stylus profilometry.

The adhesives commonly employed within disk drive assemblies are largely comprised of polymerized acrylate and methacrylate monomers. Outgassing of the low molecular weight acrylate/methacrylate oligomers and monomers have been detected in the gas phase of hard-disk drives. Contaminants used in the tests were methyl methacrylate, methyl acrylate, isopropyl methacrylate and acrylic acid.

All of these contaminants were found to lead to the formation of polymeric deposits on unlubricated disks within a short period of time e.g., less than 10 minutes. On lubricated disks, the formation rate was related to the thickness of the lubricant layer decreasing with increasing lubricant thickness over the range of 4–10 Å. At 6 Å, polymer deposits formed within 1 hour and at 10 Å, there was no polymer deposits within the 24 hours test period.

In the second set of testing under the same test conditions, the methacrylate or acrylate monomer was accompanied by an amine inhibitor. The pressure of the amine was kept at a value of nominally one-tenth of the pressure of the polymerizing species. Disk lubricant thickness ranged from 0–10 Å. With diethyl and diisopropyl amine there was no deposition of material on either the head or disk at any lubricant thickness (0–10 Å) during the 24 hour test period.

EXAMPLE 2

Utilizing the environmental chamber described above the potential polymerization of gaseous siloxane monomers at the head-disk interface was tested. Three siloxane monomers were tested: hexamethyl disiloxane, octamenthly trisiloxane, and octamethyl tetrasiloxane.

The environmental test chamber was run under similar conditions described above. The total pressure was kept at nominally 0.2–0.3 atmosphere, and the tester was operated on-track at 3600 rpm. All testing was done at 30° C., for times that ranged from 10 minutes to 24 hours. After the tests, the disks and the heads were removed for analysis via optical microscopy, and FTIR.

Introduction of any of the three siloxane precursors to the environmental chamber led to the production of deposits on both the disk surface and the head within 10–20 minutes. The deposit was analyzed via FTIR and found to be a partially oxidized polymeric siloxane. The formation of the polymeric siloxane was not dependent on the thickness of the lubricant.

Utilizing the same concentration of siloxane precursor, the vapor of diethyl amine was added to the environmental chamber and the testing repeated. Under these conditions no polysiloxane deposition was observed after 500 minutes. Only after 1500 minutes of testing was some polysiloxane observed on the surfaces of the head. Thus the rate of polysiloxane polymerization was slowed by approximately a factor of 100 by the presence of the amine vapor.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

What is claimed is:

1. A magnetic recording device for reading or writing magnetically comprising:
   (a) a housing comprising one or more surfaces;
   (b) a disk comprising a substrate, a metallic magnetic layer, and a lubricant layer;
   (c) a head supported on a slider for magnetically reading data to or magnetically writing data from the magnetic layer on the disk;
   (d) a motor operable to rotate the disk, said motor comprising one or more surfaces;
   (e) an actuator connected to the slider for moving the head across the disk; and
   (f) a monomeric chemical base which is solid or liquid at 60° C. and ambient pressure and is coated on said one or more surfaces of the housing or motor.

2. The device of claim 1 wherein the base is an organic base.

3. The device of claim 2 wherein the base is selected from an alkyl amine, aminophenol, piperidine, pyridine and aniline.

4. The device of claim 3 wherein the base is an alkyl amine.

5. The device of claim 4 wherein the base is di($C_{1-5}$) alkyl amine or tri($C_{1-5}$) alkyl amine.

6. A magnetic recording device for reading or writing magnetically comprising:
   (a) a housing;
   (b) a disk comprising a substrate, a metallic magnetic layer, and a lubricant layer;
   (c) a head supported on an air-bearing slider for magnetically reading data to or magnetically writing data from the magnetic layer on the disk;
   (d) a motor operable to rotate the disk;
   (e) an actuator connected to the slider for moving the head across the disk; and
   (f) a container containing a monomeric chemical base which is solid or liquid at 60° C. and ambient pressure.

7. The device of claim 6 wherein the base is an organic base.

8. The device of claim 7 wherein the base is selected from an alkyl amine, aminophenol, piperidine, and aniline.

9. The device of claim 8 wherein the base is an alkyl amine.

10. The device of claim 9 wherein the base is di($C_{1-5}$) alkyl amine or tri($C_{1-5}$) alkyl amine.

11. A magnetic recording device for reading or writing magnetically comprising:
    (a) a disk comprising a substrate, a metallic magnetic layer, and a lubricant layer;
    (b) a head supported on an air-bearing slider for magnetically reading data to or magnetically writing data from the magnetic layer on the disk;
    (c) a motor operable to rotate the disk;
    (d) an actuator connected to the slider for moving the head across the disk; and
    (e) a breather filter having a monomeric chemical base which is a liquid or solid at 60° C. and ambient pressure and is releasably adhered to the filter.

12. The device of claim 11 wherein the base is selected from an alkyl amine, aminophenol, piperidine, pyridine and aniline.

13. The device of claim 12 wherein the base is an alkyl amine.

14. The device of claim 13 where the amine is di($C_{1-5}$) alkyl amine or tri($C_{1-5}$) alkyl amine.

* * * * *